(12) United States Patent
Higashiya et al.

(10) Patent No.: US 11,720,082 B2
(45) Date of Patent: Aug. 8, 2023

(54) SCADA WEB HMI SYSTEM

(71) Applicant: Toshiba Mitsubishi-Electric Industrial Systems Corporation, Tokyo (JP)

(72) Inventors: Ryosuke Higashiya, Tokyo (JP); Akira Nojima, Tokyo (JP); Nobuo Shimizu, Tokyo (JP); Ryo Shimizu, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 645 days.

(21) Appl. No.: 16/958,761

(22) PCT Filed: Oct. 10, 2019

(86) PCT No.: PCT/JP2019/039967
§ 371 (c)(1),
(2) Date: Jun. 29, 2020

(87) PCT Pub. No.: WO2021/070315
PCT Pub. Date: Apr. 15, 2021

(65) Prior Publication Data
US 2023/0145367 A1 May 11, 2023

(51) Int. Cl.
*G05B 19/4155* (2006.01)

(52) U.S. Cl.
CPC .......... *G05B 19/4155* (2013.01); *G05B 2219/32404* (2013.01)

(58) Field of Classification Search
None
See application file for complete search history.

(56) References Cited

U.S. PATENT DOCUMENTS

| | | | |
|---|---|---|---|
| 6,182,139 B1 | 1/2001 | Brendel | |
| 7,437,478 B2 * | 10/2008 | Yokota | H04L 67/61 709/240 |
| 7,561,937 B2 | 7/2009 | Reed et al. | |
| 9,870,545 B2 | 1/2018 | Cronin et al. | |

(Continued)

FOREIGN PATENT DOCUMENTS

| | | |
|---|---|---|
| JP | 2017-27211 A | 2/2017 |
| JP | 6548807 B2 | 7/2019 |

OTHER PUBLICATIONS

International Search Report and Written Opinion dated Nov. 26, 2019 for PCT/JP2019/039967 filed on Oct. 10, 2019, 7 pages.

(Continued)

*Primary Examiner* — Ryan A Jarrett
(74) *Attorney, Agent, or Firm* — Xsensus LLP

(57) ABSTRACT

A SCADA web HMI system dynamically distributes server connection priority lists from web HMI servers to HMI clients in accordance with order of assignment which takes load balancing into account. As a result, preliminary settings associated with connection priority do not need to be made on the HMI clients. Also, since the server connection priority lists are assigned to the HMI clients in accordance with the order of assignment which takes load balancing into account, the numbers of clients connected to the individual web HMI servers are equalized and the load balancing can be ensured. The SCADA web HMI system can reduce the operating costs necessary in client settings while ensuring redundancy and load balancing of servers.

6 Claims, 15 Drawing Sheets

(56) References Cited

U.S. PATENT DOCUMENTS

2005/0155043 A1 7/2005 Schulz et al.
2018/0088548 A1 3/2018 Sangi

OTHER PUBLICATIONS

Office Action issued on Oct. 26, 2021, in corresponding Taiwanese patent Application No. 109115713, 11 pages.
Taiwan Office Action issued May 18, 2021 in Taiwan Patent Application No. 109115713.
Office Action dated May 17, 2022, in corresponding Indian patent Application No. 202017009150, 5 pages.

* cited by examiner

SERVER GROUP INFORMATION TABLE

| NO. | SERVER NAME | IP ADDRESS | REDUNDANT | SERVER GROUP ID |
|---|---|---|---|---|
| 1 | SVR1 | 192.168.0.1 | TRUE | 1 |
| 2 | SVR2 | 192.168.0.2 | TRUE | 1 |
| 3 | SVR3 | 192.168.0.3 | TRUE | 2 |
| 4 | SVR4 | 192.168.0.4 | TRUE | 2 |
| 5 | SVR5 | 192.168.0.5 | TRUE | 2 |

(A) SERVER CONNECTION PRIORITY LIST TABLE WHEN NUMBER OF SERVERS IS 2

| ORDER OF ASSIGNMENT | SERVER CONNECTION PRIORITY LIST |
|---|---|
| 1st clinet | SVR1 -> SVR2 |
| 2nd clinet | SVR2 -> SVR1 |
| 3rd client | SVR1 -> SVR2 |
| 4th client | SVR2 -> SVR1 |
| ... | ... |

BASIC PRIORITY LIST TABLE WHEN N = 2 (rows 1–2)

(B) SERVER CONNECTION PRIORITY LIST TABLE WHEN NUMBER OF SERVERS IS 3

| ORDER OF ASSIGNMENT | SERVER CONNECTION PRIORITY LIST |
|---|---|
| 1st clinet | SVR1 -> SVR2 -> SVR3 |
| 2nd clinet | SVR2 -> SVR3 -> SVR1 |
| 3rd client | SVR3 -> SVR1 -> SVR2 |
| 4th client | SVR1 -> SVR3 -> SVR2 |
| 5th clinet | SVR2 -> SVR1 -> SVR3 |
| 6th clinet | SVR3 -> SVR2 -> SVR1 |
| 7th clinet | SVR1 -> SVR2 -> SVR3 |
| ... | ... |

BASIC PRIORITY LIST TABLE WHEN N = 3 (rows 1–6)

FIG. 10

SERVER CONNECTION PRIORITY LIST TABLE WHEN NUMBER OF SERVERS IS 2

| ORDER OF ASSIGNMENT | SERVER CONNECTION PRIORITY LIST | ASSIGNMENT DESTINATION CLIENT | CONNECTED FLAG | LAST CONNECTION TIME |
|---|---|---|---|---|
| 1st clinet | SVR1 -> SVR2 | CLIENT A | CONNECTED | - |
| 2nd clinet | SVR2 -> SVR1 | CLIENT E | DISCONNECTED | yyyy/m/d:h/mm |
| 3rd client | SVR1 -> SVR2 | CLIENT B | DISCONNECTED | yyyy/m/d:h/mm |
| 4th client | SVR2 -> SVR1 | Not assigned | | |
| ... | | | | |

FIG. 13

SCADA WEB HMI SYSTEM

CROSS-REFERENCE TO RELATED APPLICATION

The present application is based on PCT filing PCT/JP2019/039967, filed Oct. 10, 2019, the entire contents of which are incorporated herein by reference.

FIELD

The present invention relates to a SCADA web HMI system with a redundant architecture.

BACKGROUND

Supervisory control and data acquisition (SCADA) is known as an architecture for monitoring and control of social infrastructure systems. Social infrastructure systems may encompass steel rolling systems, power transmission and transformation systems, water and sewage treatment systems, building management systems, road systems, etc.

A SCADA system, which is a kind of industrial control system, enables computer-based system monitoring and process control. SCADA needs to provide readiness (real-time property) commensurate with system's processing performance.

A SCADA system is typically configured with the following subsystems:
(1) Human Machine Interface (HMI)
A human-machine interface (HMI) is a mechanism that presents data of a target process (monitoring target device) to an operator and enables the operator to carry out monitoring and control of the process. For example, the patent literature PTL 1 discloses a SCADA HMI that includes an HMI screen adapted to operate on a SCADA client.
(2) Monitoring and Control System
A monitoring and control system collects signal data in a process and sends a control command to the process. It may be configured by a programmable logic controller (PLC) or the like.
(3) Remote Input Output (RIO) Unit
A remote input output unit connects to sensors installed in a process, converts signals of the sensors into digital data, and sends the digital data to the monitoring and control system.
(4) Communication Infrastructure
A communication infrastructure connects the monitoring and control system and the remote input output device.

CITATION LIST

Patent Literature

[PTL 1] JP 2017-27211 A

SUMMARY

Technical Problem

The client program of the HMI subsystem in PTL 1 is configured by a program that is dependent on a machine environment. In order to achieve cost reduction for SCADA HMI subsystems, the inventor of this application developed a browser-based HMI subsystem that is not dependent on a machine environment.

The following advantages are expected when the SCADA HMI subsystem is configured as a web application that runs on a web browser:
(1) Since a web browser is provided in many terminal devices such as personal computers, tablet PCs, and the like, various terminal devices are available as SCADA HMI subsystems.
(2) Web browsers have high-performance rendering capabilities and advanced GUI interaction functions including animation can be readily incorporated into web browsers.

In the meantime, redundant server architectures need to be provided in SCADA HMI subsystems so as to achieve high reliability. Redundant architecture is a scheme for multiplexing of servers and implementation of fail-over to cause processing by one server having a high connection priority to be taken over by another server having a low connection priority in the event of failure of the former server and thereby continue the operation.

Redundant architectures may encompass active/standby architecture and active/active architecture. The active/standby architecture includes an active server (primary server) and a standby server (secondary server), where the secondary server starts to operate in the event of failure of the primary server to take over the processing.

The active/active architecture keeps all channels always operating to distribute the processing and reduce the loads of the individual servers. For each client, a primary server and a secondary server are individually specified.

The present invention relates to an active/active architecture. The problem of this architecture is that it is necessary to specify a primary server and a secondary server on a per-client basis and implement management such that loads on the individual servers are equalized as a system as a whole.

For example, description may be given based on an example where the system architecture includes two servers (S1, S2) and six clients (C1, C2, C3, C4, C5, and C6). Settings are made on C1, C2, and C3 such that S1 and S2 are defined therefor as a primary server and a secondary server, respectively. Settings are made on C4, C5, and C6 such that S2 and S1 are defined therefor as a primary server and a secondary server, respectively. In the case where all the devices including the two servers and the six clients are operating, the loads on the two servers are equal to each other with three clients associated with corresponding one of the servers.

However, in some cases, some of the clients (C5, C6) may not be operating. In this case, the load on the S1 corresponds to three clients and the load on the S2 corresponds to one client, so that the load balance of the servers is lost. Nevertheless, changes to the settings of the clients each time depending upon the operation statuses of the clients will trigger increase in their operating costs.

A possible approach that may be considered here would be to dynamically change the connection destination server of a client according to the server load balance. However, as fail-over is a high-load operation, a problem arises that operator's operations are temporarily interrupted. In view of this, switching between connection destination servers should be performed only in the event of server failure.

The present invention has been made to solve the above-identified problems. An object of the present invention is to provide a SCADA web HMI system that can reduce the operating cost necessary in the client architecture while ensuring redundancy and load balancing of the servers.

Solution to Problem

In order to achieve the above-described object, a SCADA web HMI system in accordance with the present invention is configured as follows.

The SCADA web HMI system includes a plurality of HMI clients and a plurality of web HMI servers. Each HMI client runs a web browser that displays a human machine interface (HMI) screen on which parts indicative of a state of a plant are arranged. Each web HMI server connects to a programmable logic controller and transmits a display signal for updating of states of the parts to the web browser in accordance with a PLC signal received from the programmable logic controller. At least two of the web HMI servers pertain to the same server group.

Each of the web HMI servers includes at least one processor and a memory that stores a program. The program, when being run by the at least one processor, causes the at least one processor to perform processing including the following processes.

A table sharing process is performed to share a server connection priority list table by all of the web HMI servers pertaining to the server group.

A connection priority list transmission process is performed, in response to a list request signal being received from the HMI client, to transmit a server connection priority list, the server connection priority list defining connection priorities of all of the web HMI servers pertaining to the server group, where the server connection priority list is transmitted in accordance with order of assignment defined in the server connection priority list table.

The server connection priority list table defines the order of assignment such that, for each of a plurality of the server connection priority lists, numbers of the HMI clients connecting to each of the web HMI servers pertaining to the server group are made close to an equal number.

Each of the HMI clients includes at least one processor and a memory that stores a program. The program, when being run by the at least one processor, causes the at least one processor to perform processing including the following processes.

An alive monitoring process is performed to monitor operating states of all of the web HMI servers pertaining to the server group.

A connection priority list request process is performed to transmit, to any one of the web HMI servers pertaining to the server group, the list request signal for requesting the server connection priority list.

A server connection process is performed, in response to the server connection priority list being received, to establish connection to the web HMI server having a highest connection priority defined in the server connection priority list from at least one or more of the operating web HMI servers pertaining to the server group.

A fail-over process is performed, in response to the currently connected web HMI server entering a non-operating state, to switch connection from connection to the currently connected web HMI server to connection to the web HMI server having a highest connection priority defined in the server connection priority list from at least one or more of the operating web HMI servers pertaining to the server group.

Preferably, each of the HMI clients further performs the following processes.

A server group information request process is performed to transmit a server group information request signal to a target web HMI server which is a web HMI server designated by an URL including a target server name, the server group information request signal being used to request server group information which defines the server group.

A client authentication information transmission process is performed to transmit client authentication information including an account name and a password of the HMI client.

An installer execution confirmation process is performed to download a pseudo thin client installer from the target web HMI server to the web browser and display a notification bar for running the pseudo thin client installer.

A privilege elevation process is performed, in response to an operation that allows execution of the pseudo thin client installer being made on the notification bar, to display a privilege elevation dialog for granting an administrator privilege of the HMI client.

A shared folder creation process is performed, in response to an operation that allows privilege elevation being made on the privilege elevation dialog, to create a shared folder to which access is allowed to be made from the web HMI server as a result of the client authentication information being input from the web HMI server.

A resident process configuration process is performed to copy a client resident program from the web HMI server to the shared folder and set the client resident program as a resident process using the client authentication information written to the shared folder.

Preferably, each of the web HMI servers further performs the following processes.

A server group information write process is performed, in response to the server group information request signal being received, to repeat writing of the server group information until the server group information which defines server names of all servers of the server group to which the target web HMI server pertains is written to the shared folder.

A client authentication information write process is performed, in response to the client authentication information being received, to repeat writing of the client authentication information until the client authentication information is written to the shared folder.

Advantageous Effects of Invention

According to the present invention, the server connection priority lists are dynamically assigned from the web HMI servers to the HMI clients in accordance with order of assignment. By virtue of this, preliminary settings associated with connection priority do not need to be made on the HMI clients. Also, since the server connection priority lists are assigned to the HMI clients in accordance with the order of assignment which takes load balancing into account, the numbers of clients connected to the individual web HMI servers are equalized and the load balancing can be ensured. The SCADA web HMI system of the present invention can reduce the operating costs necessary in client settings while ensuring redundancy and load balancing of servers.

BRIEF DESCRIPTION OF DRAWINGS

FIG. 2 is a diagram that illustrates an example of a server group information table in the first embodiment of the present invention.

FIG. 9 is an example of a screen displayed on a monitor of the HMI client during the process of installation of the pseudo thin client in the first embodiment of the present invention.

FIG. 10 is a diagram that illustrates a specific example of a server connection priority list table in the first embodiment of the present invention.

FIG. 13 is a diagram that illustrates an example of the server group information table in the first embodiment of the present invention.

DESCRIPTION OF EMBODIMENTS

Figure 1:
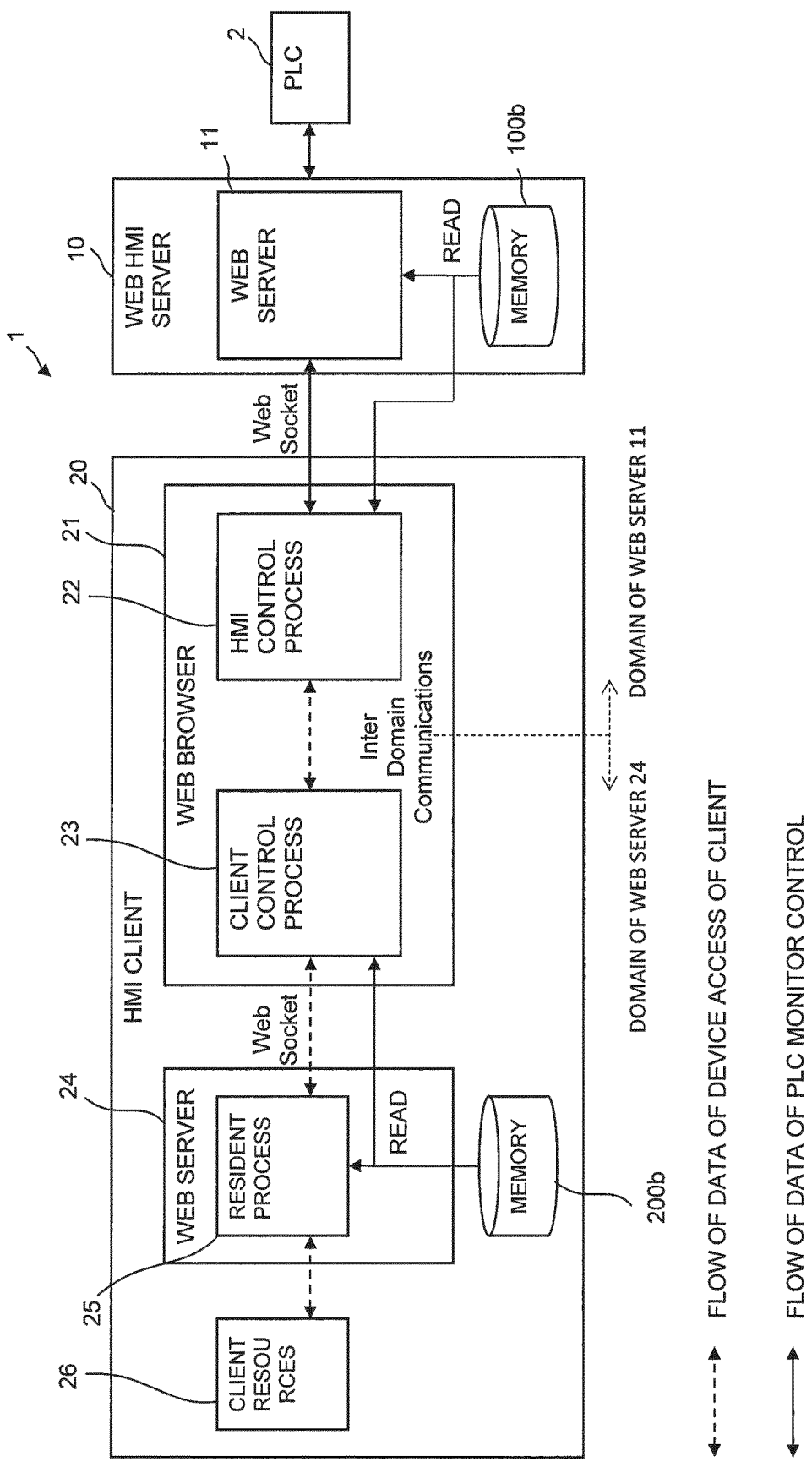
FIG. 1 is a diagram for explanation of a system architecture of SCADA in a first embodiment of the present invention.

Embodiments for implementation of the present invention will be described in accordance with the accompanying drawings. Note that the same reference signs are given to the same or corresponding portions in the drawings. Redundant explanations of such portions will be simplified or omitted as appropriate.

First Embodiment

<Overall Configuration>

FIG. 1 is a diagram for explanation of a system architecture of a SCADA system. The SCADA system includes, as its subsystems, a human machine interface (HMI) 1; a programmable logic controller (hereinafter indicated as "PLC 2"), which serves as a monitoring and control system; a communication infrastructure (not shown in the drawings); and a remote input output (RIO) unit (not shown in the drawings). The SCADA system connects to a monitoring target device (not shown in the drawings) via the PLC 2 or the RIO unit.

The explanations of the PLC 2 (monitoring and control system), the communication infrastructure, and the RIO unit have already been provided in the Background section and accordingly will be omitted. The monitoring target device may be a sensor, actuator, or the like which is a constituent component of a plant to be monitored and controlled.

The HMI 1 (SCADA web HMI system) includes a plurality of SCADA web HMI server devices (hereinafter referred to as "web HMI server") 10 and a plurality of HMI client terminals (hereinafter referred to as "HMI client") 20.

The web HMI servers 10 connect to a plurality of the PLCs 2 via a computer network. The individual web HMI servers will be indicated simply as "web HMI server 10" if they do not need to be distinguished from each other. The web HMI servers 10 connect via the computer network to the HMI clients 20. The individual HMI clients will be indicated simply as "HMI client 20" if they do not need to be distinguished from each other. The HMI client 20 runs a web browser 21. The web browser 21 displays an HMI screen in which parts representing the state of the plant are arranged.

Figure 15:
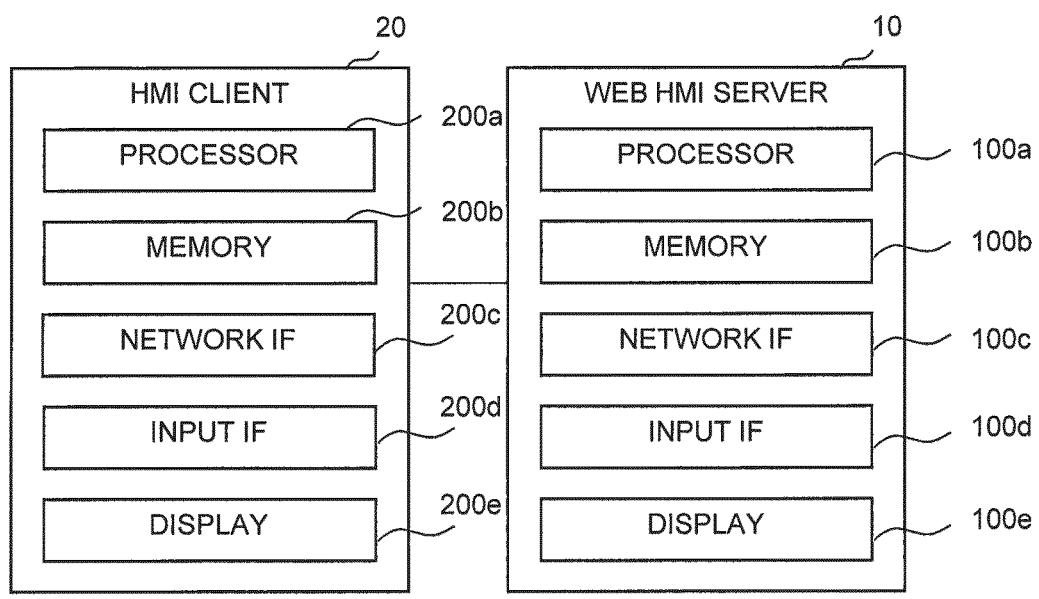
FIG. 15 is a block diagram that illustrates an example of a hardware architecture provided in the HMI client and the web HMI server.

The web HMI server 10 includes, as depicted in FIG. 15 which will be discussed later, at least one processor 100a and a memory 100b that stores a program in which the processing to be performed by a web server 11 is described. The program, when run by the processor 100a, causes the processor 100a to perform the processing described in the program. The memory 100b includes a ROM unit, a RAM unit, an HDD, an SSD, and the like.

The web HMI server 10 runs the web server 11 which is configured as an HMI server application. The web HMI server 10 transmits, in accordance with a PLC signal received from the PLC 2, a display signal to the web browser 21, where the display signal is used to update the state of the parts arranged in the HMI screen. Also, the web HMI server 10 receives a control command from the web browser 21 and transmits the control command to the PLC 2.

The HMI client 20 includes, as depicted in FIG. 15 which will be discussed later, at least one processor 200a and a memory 200b that stores a program in which the processing to be performed by the HMI client 20 is described. The program, when run by the processor 200a, causes the processor 200a to perform the processing described in the program. The memory 200b includes a ROM unit, a RAM unit, an HDD, an SSD, and the like. The program includes data for executing the web browser 21, an HMI control process 22, a client control process 23, a web server 24, and a resident process 25.

<Pseudo Thin Client>

In a typical web application, web content that runs on a web browser is dynamically loaded from the web server to run. As a result, a client does not require installation of software. Thus, the client of the web application is called a thin client. However, in the web application of the SCADA HMI system in accordance with this embodiment, it is difficult to implement operation based on a thin client. Specific aspects will be discussed below.

The program that runs on the web browser 21 is subject to operational restrictions for security considerations. Communications with the web servers and display on the web browser 21 are the only operations allowable. In other words, it is not allowed to make direct access to files on the memory 200b (e.g., a hard disk) and devices on the HMI client 20 such as the client resource 26 (e.g., a printer).

In the meantime, a SCADA HMI system needs to have the following features:
(1) writing execution logs to a disk file for maintenance
(2) accessing a printer
(3) obtaining an execution machine name
(4) starting Windows® applications In order to effectuate such features that necessitate access to the client device, the HMI client 20 executes the resident process 25 (Windows® service) on the web server 24. The web browser 21 is allowed to make access, via the resident process 25, to the devices of the HMI client 20 which cannot be directly executed from the web application.

On the web browser 21 that runs on the HMI client 20, the HMI control process 22 and the client control process 23 are performed. The HMI control process 22 is a currently running instance of the HMI control program. The HMI control program is loaded from the web server 11 of the web HMI server 10 so as to run in the domain of the web server 11 of the web HMI server 10. The client control process 23 is a currently running instance of the client control program. The client control program is loaded from the web server 24 of the HMI client so as to be run in the domain of the web server 24 of the HMI client 20.

Since these programs run in different domains, one of them cannot directly access data of the domain associated with the other of them, and vice versa. As a result, data is to be exchanged using inter-domain communications. The HMI control program is a main program of the SCADA HMI for monitoring and controlling the PLC 2. The client control program is a program for accessing the client devices (a disk, a printer, etc.) via the resident process 25 and it runs in accordance with the instruction of the HMI control program.

The resident process 25 and the client control process 23 are instances of the program that have been read from a storage unit (the memory 200*b*) of the HMI client 20. As a result, in the case of a browser-based HMI subsystem, despite the fact that processes are performed based on a web application, some of the programs need to be installed on the HMI client 20. For this reason, the client in accordance with this embodiment is called "pseudo thin client" to discriminate it from a thin client that does not require such installation.

The number of HMI clients 20 is larger than the number of the web HMI servers 10. As a result, at the time of the installation of a pseudo thin client, it is desirable that no client-specific setting work need to be made on the HMI clients 20.

In view of this, in the SCADA web HMI system of this embodiment, in consideration of achievement of server redundancy and load balancing, it is sought to reduce the operating costs required for client settings. Specifically, it is sought to achieve (1) automatic distribution of server group information at the time of pseudo client installation and (2) dynamic distribution of a server connection priority list at the time of start of the HMI client.

<(1) Automatic Distribution of Server Group Information at the Time of Pseudo Thin Client Installation>

First, the server group will be described. The server group is a set of servers for achieving server redundancy. Servers pertaining to the same server group have a relationship of a "primary server" and a "secondary server" in relation to each other. Definition of the server group is given by a server group information table as shown in FIG. 2.

In FIG. 2, the servers having the same "SERVER GROUP ID" constitute one server group. The HMI clients 20 are associated with any one of the server groups. The HMI clients 20 can be connected to any of the web HMI servers 10 within their associated server groups. When the web HMI server 10 to which the HMI client 20 is being connected fails, then the HMI client 20 can switch the connection from the faulty server to another server within the server group and continue the operation (fail-over).

Next, the installation of a pseudo thin client will be described. As the client of the browser-based SCADA web HMI system is not a thin client but a pseudo thin client, installation work is necessary. The installation process in this embodiment is characterized by the fact that the server group information is automatically distributed to the individual HMI clients.

In the system in accordance with this embodiment, the pseudo thin client is installed using the web browser 21. As the machine on which the pseudo thin client is installed, for example, a pre-installed machine of Windows® may be contemplated. On a pre-installed machine of Windows®, an OS and a web browser (Internet Explorer®, Microsoft Edge®, etc.) are installed. In the HMI client 20, when the web browser 21 accesses a designated URL, the installation process to install the pseudo thin client is started.

Figure 3:
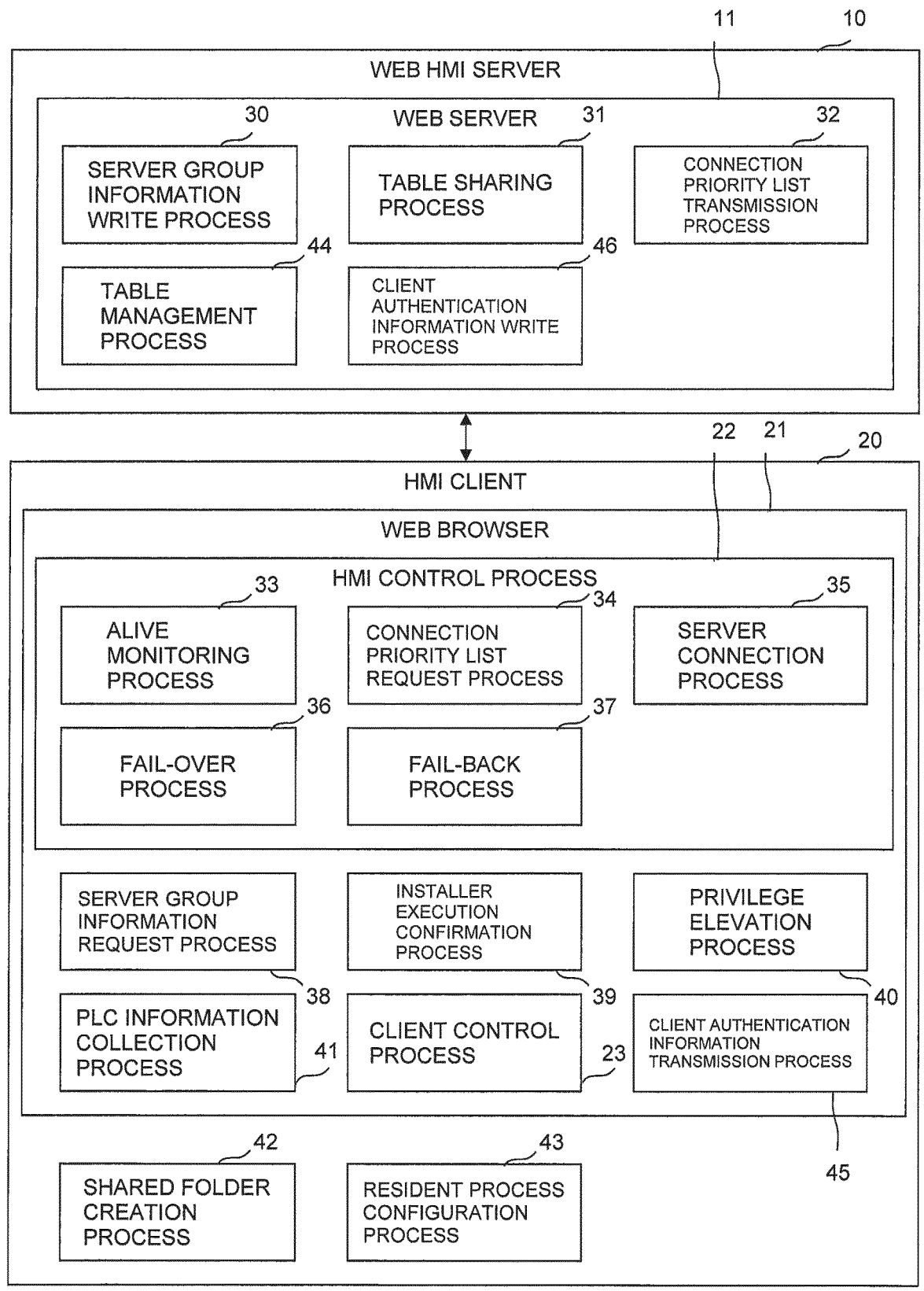
FIG. 3 is a block diagram for explanation of processing executed in an HMI client and a web HMI server in the first embodiment of the present invention.
Figure 4:
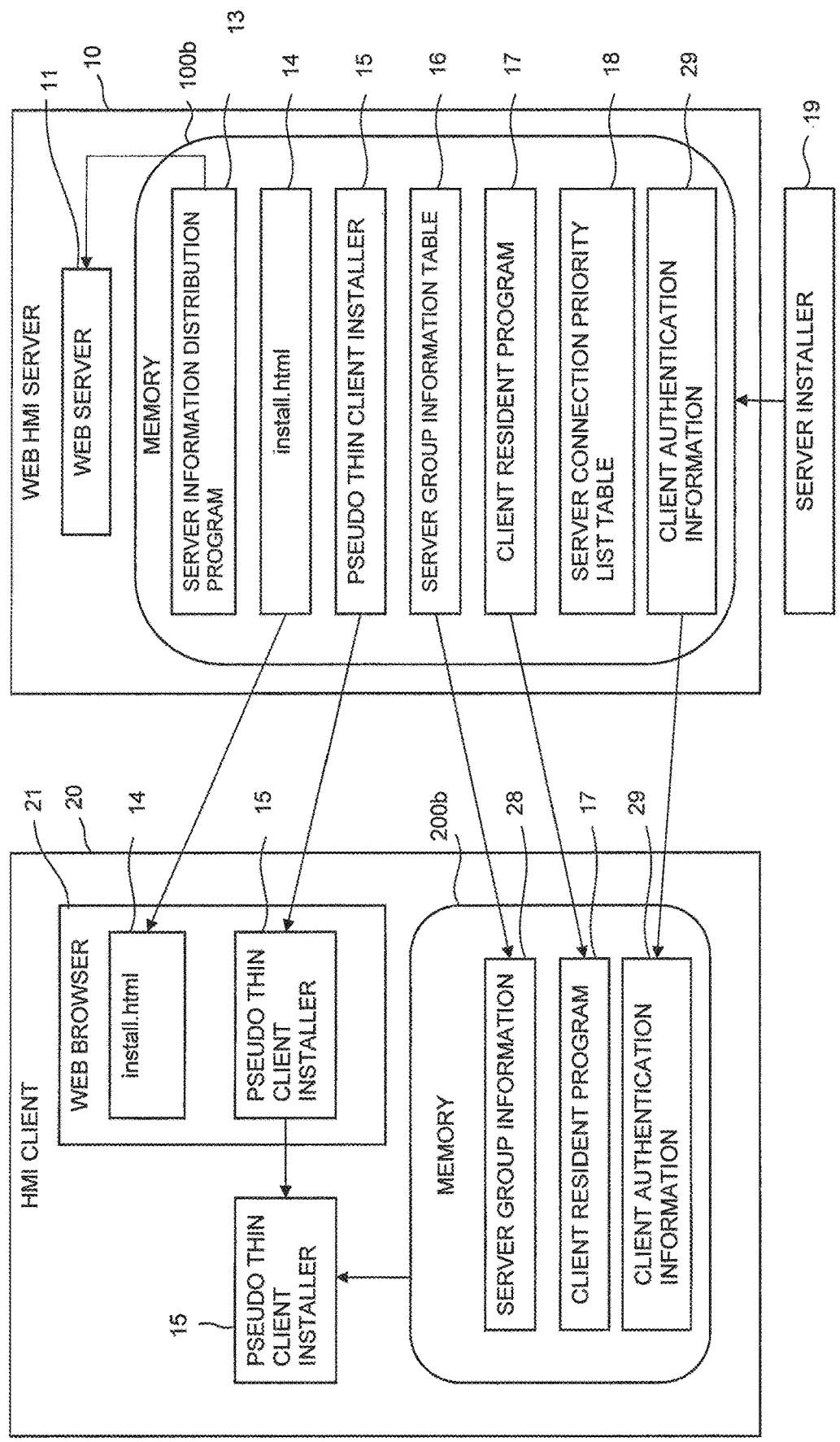
FIG. 4 is a diagram for explanation of installation of a pseudo thin client in the first embodiment of the present invention.
Figure 5:
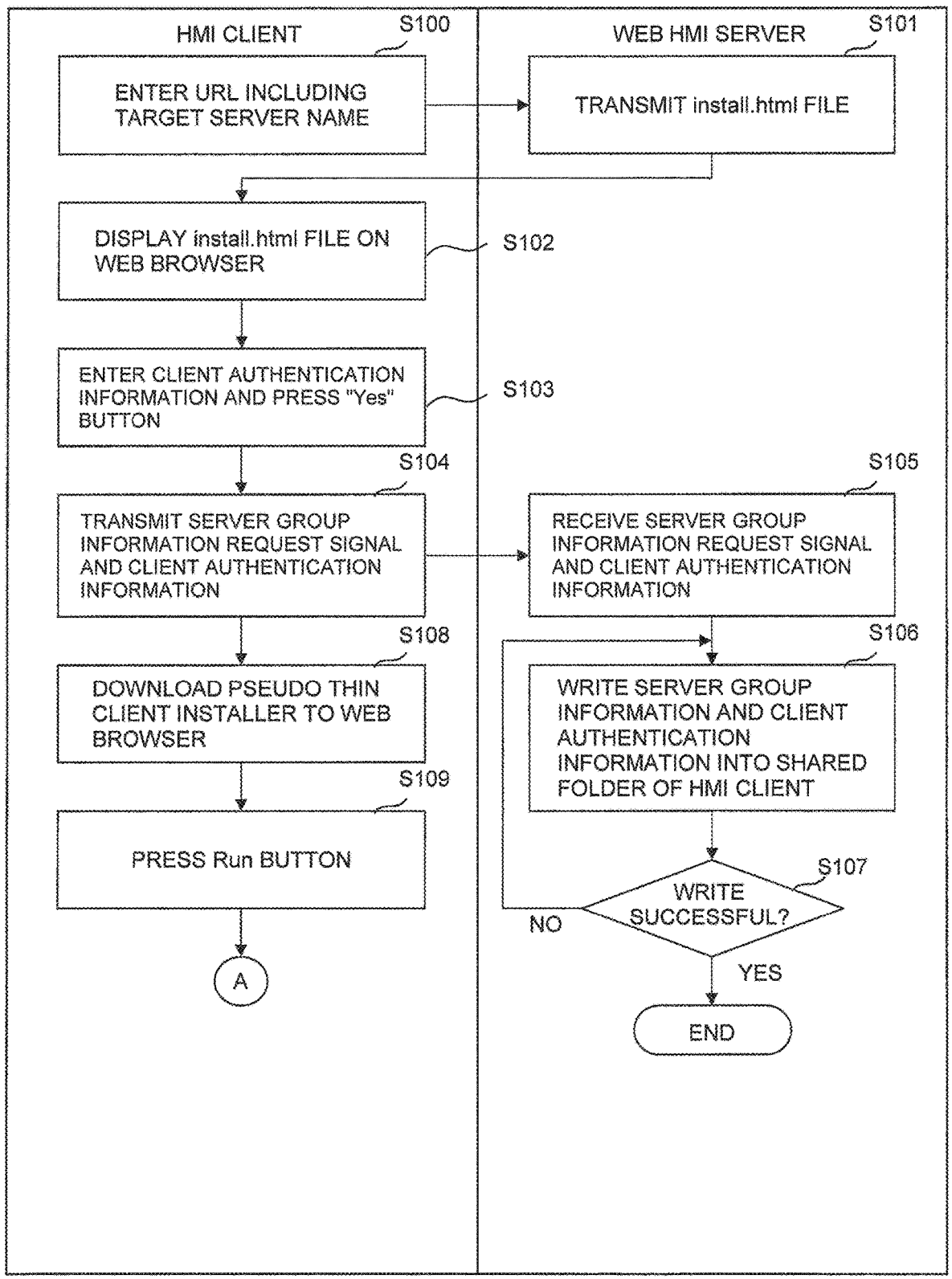
FIG. 5 is a flowchart for explanation of an installation process flow to install the pseudo thin client in the first embodiment of the present invention.
Figure 6:
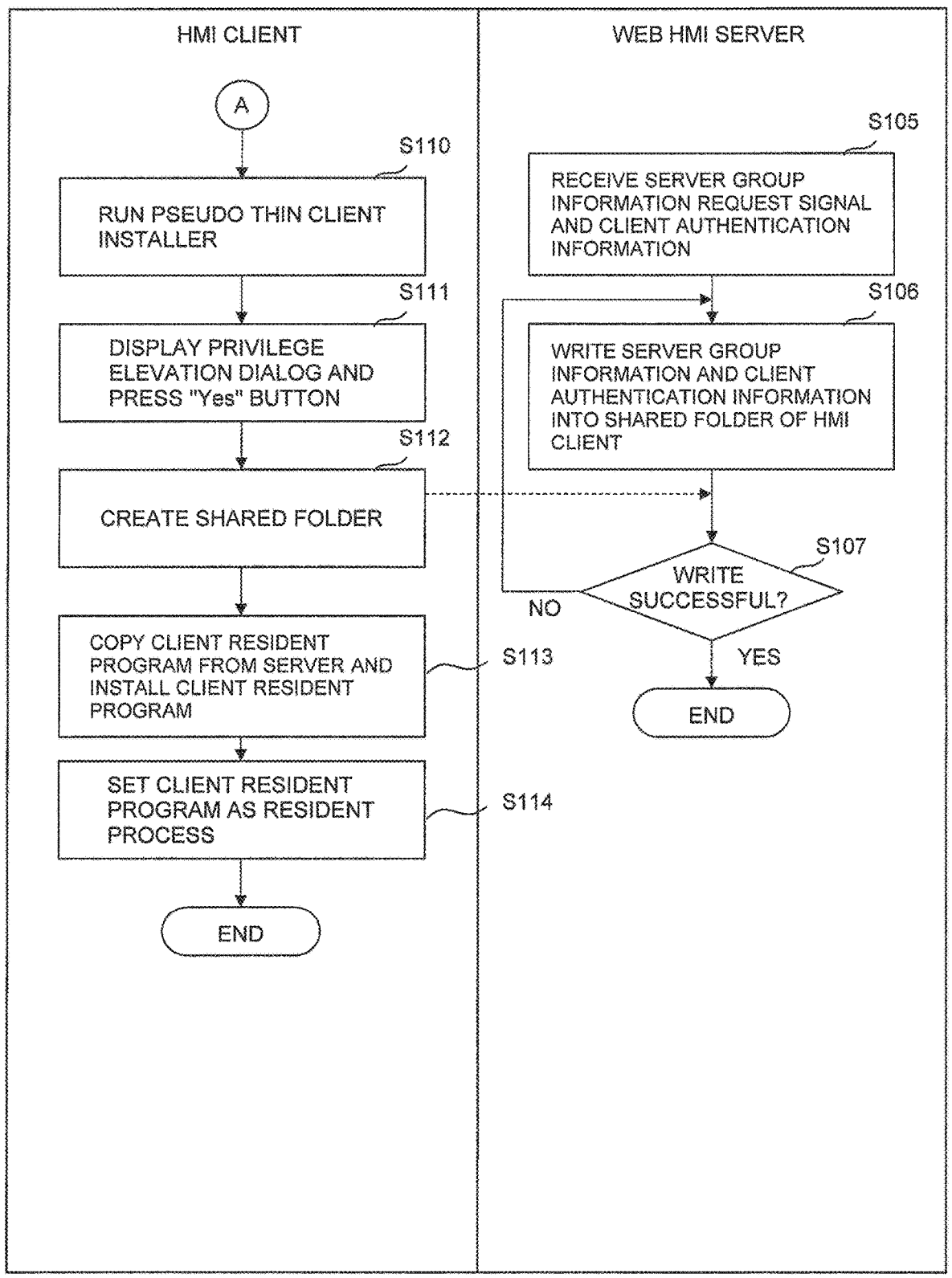
FIG. 6 is a flowchart for explanation of the installation process flow to install the pseudo thin client in the first embodiment of the present invention.
Figure 7:
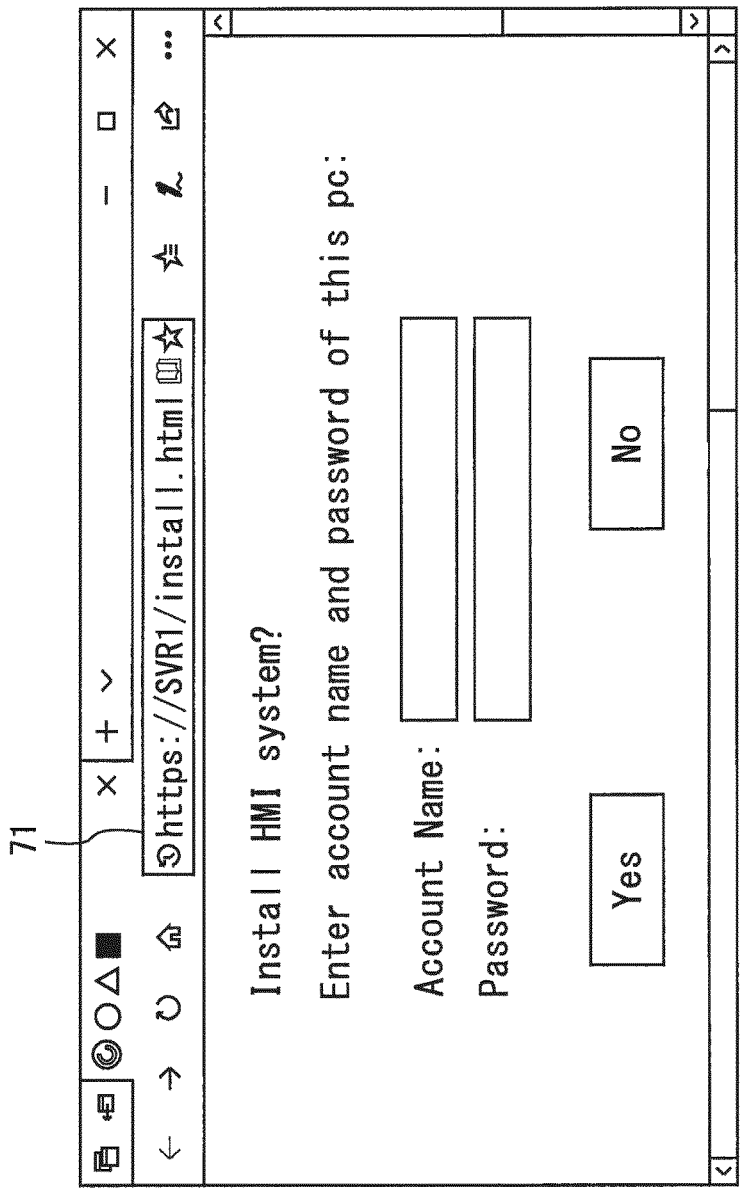
FIG. 7 is an example of a screen displayed on a monitor of the HMI client during the process of installation of the pseudo thin client in the first embodiment of the present invention.
Figure 8:
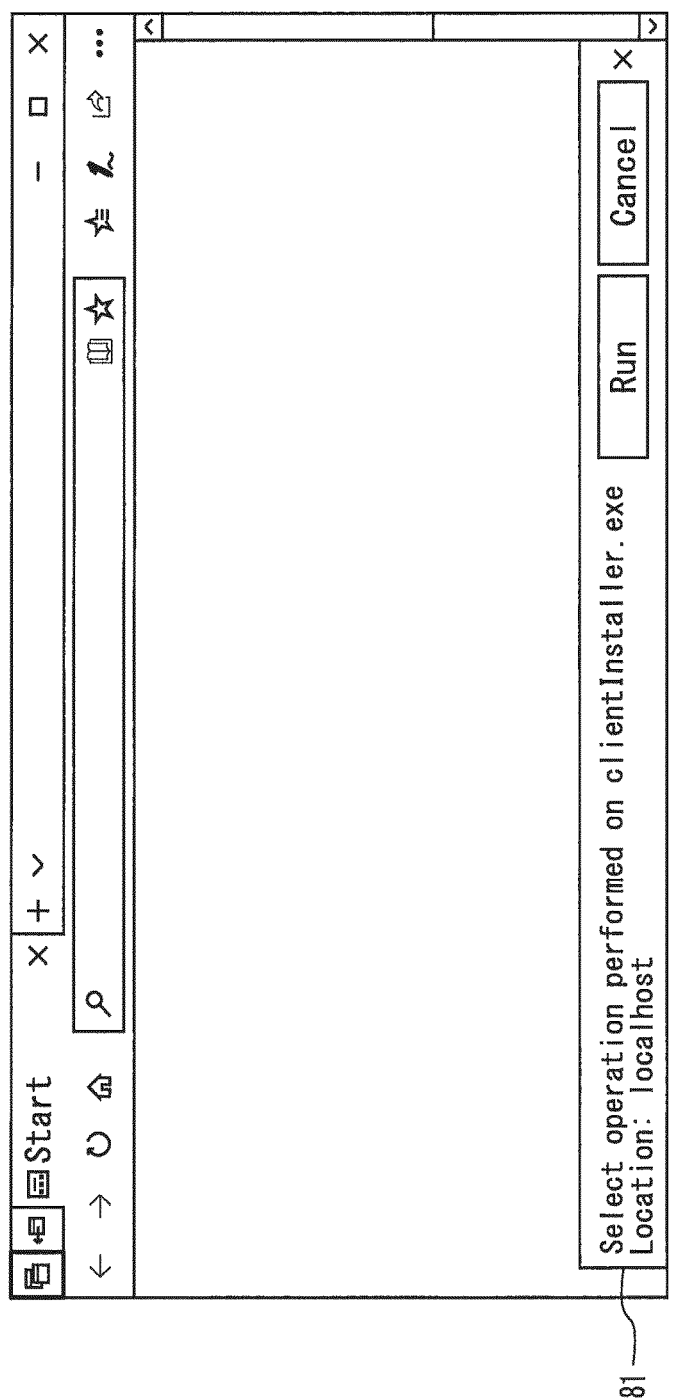
FIG. 8 is an example of a screen displayed on a monitor of the HMI client during the process of installation of the pseudo thin client in the first embodiment of the present invention.
Figure 9:
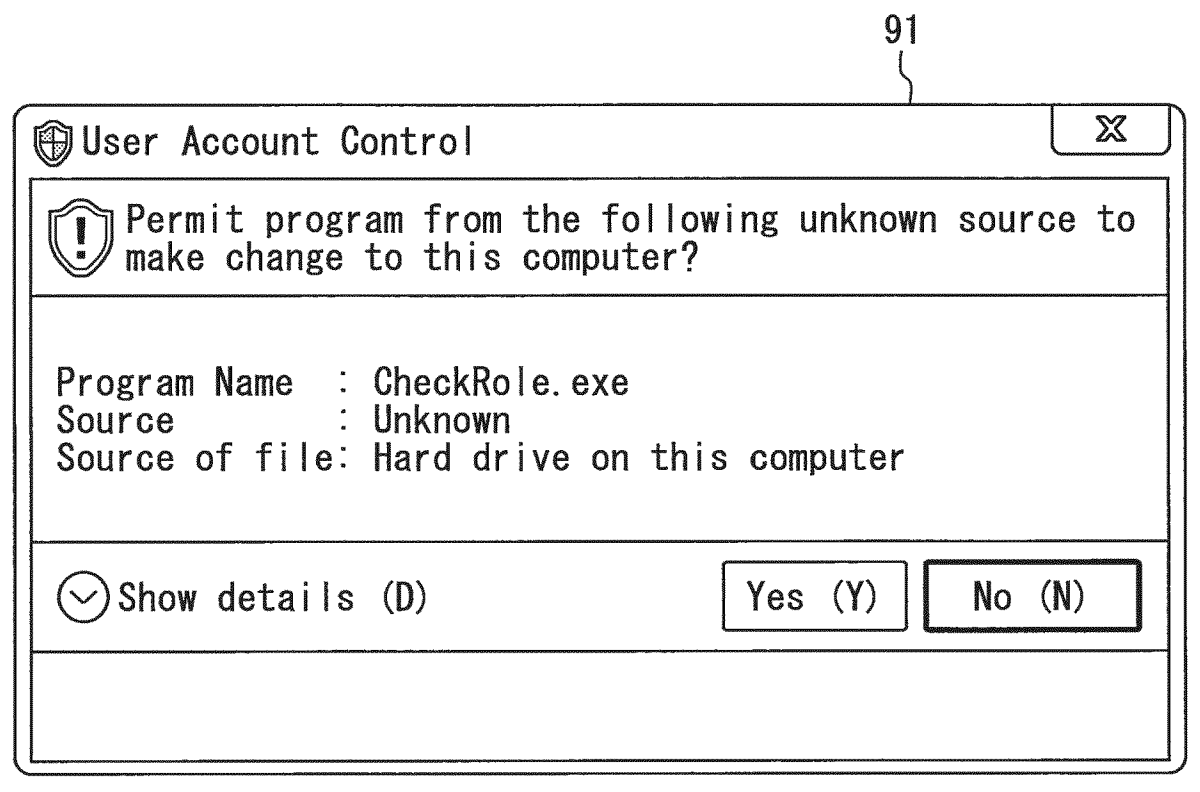

The installation process to install the pseudo thin client will be described with reference to FIGS. 3 to 9. FIG. 3 is a block diagram for explanation of the processing performed on the HMI client 20 and the web HMI server 10. FIG. 4 is a diagram for explanation of installation of a pseudo thin client. FIGS. 5 and 6 are flowcharts for explanation of the installation process flow to install the pseudo thin client. FIGS. 7 to 9 are examples of a screen displayed on a monitor of an HMI client during the process of installation of the pseudo thin client.

First, at the step S100 of FIG. 5, the user enters a uniform resource locator (URL) in an address bar 71 (FIG. 7) of the web browser 21. This URL includes a target server name and a name of an installation HTML file 14 (FIG. 4) "install.html." In the example of FIG. 7, the target server name is "SVR1." The URL is transmitted to the web HMI server 10 corresponding to the target server name.

At the step S101, the web HMI server 10 transmits the "install.html" file to the HMI client 20.

At the step S102, the web browser 21 reads the "install.html" file and display the screen depicted in FIG. 7.

At the step S103, the user enters client authentication information and presses a "Yes" button displayed on the web browser 21. The client authentication information includes an account name and a password of the HMI client 20.

At the step S104, the web browser 21 transmits a server group information request signal to the web HMI server 10. Specifically, a server group information request process 38 (FIG. 3) transmits the server group information request signal to the target web HMI server which is the web HMI server 10 designated by the URL including the target server name, where the server group information request signal is used to request the server group information which defines the server group.

Also, at the step S104, a client authentication information transmission process 45 (FIG. 3) transmits the client authentication information to the web HMI server 10.

At the step S105, the web HMI server 10 receives the server group information request signal and the client authentication information. Client authentication information 29 is written to the memory 100*b* (FIG. 4). A server group information write process 30 (FIG. 3) extracts, from a server group information table 16 (FIG. 4), the server group information which defines the server names of all the servers of the server group to which the server itself (target web HMI server) pertains.

FIG. 2 is an example of the server group information table 16. If the target web HMI server "SVR1" is designated in the URL as in the example of FIG. 7, then server group information 28 (FIG. 4) will include the server SVR1 and the server SVR2 which pertain to the same server group (SERVER GROUP ID=1) as the server SVR1.

At the step S106, the server group information write process 30 attempts the processing to write the server group information 28 that has been extracted at the step S105 to the memory 200b (e.g., a hard disk) of the HMI client 20. In order that this write processing is successful, a shared folder accesses to which can be made from the web HMI servers 10 needs to be prepared in the memory 200b. If a shared folder has not yet been prepared and the write processing is not successful, then the process at the step S106 is executed again after a lapse of a predetermined period of time (the step S107). In other words, the server group information write process 30 repeats the writing of the server group information 28 until the server group information 28 that has been extracted at the step S105 is written to the shared folder.

Also, at the step S107, a client authentication information write process 46 repeats writing of the client authentication information 29 until the client authentication information 29 that has been received at the step S105 is written to the shared folder.

After the process at the step S104, an installer execution confirmation process 39 (FIG. 3) downloads a pseudo thin client installer 15 (FIG. 4) from the target web HMI server to the web browser 21 at the step S108. After that, the installer execution confirmation process 39 displays a notification bar 81 (FIG. 8) used to run the pseudo thin client installer 15. A "Run" button is arranged in the notification bar 81 displayed on the web browser 21. The "clientInstaller.exe" of FIG. 8 is the file name of the pseudo thin client installer 15. The pseudo thin client installer 15 is an executable file (having the extension ".exe").

At the step S109, the user presses the Run button displayed on the notification bar 81.

At the step S110 of FIG. 5, the pseudo thin client installer 15 is run on the HMI client 20.

At the step S111, when the pseudo thin client installer 15 is run, the dialog box depicted in FIG. 8 associated with user account control is popped up. The pseudo thin client installer 15 needs to be run with an administrator privilege. As a result, when an operation has been made to permit the notification bar 81 to run the pseudo thin client installer 15, then the privilege elevation process 40 (FIG. 3) displays a privilege elevation dialog 91 (FIG. 9) used to grant the administrator privilege of the HMI client 20. When a "Yes" button indicated in the privilege elevation dialog 91 is pressed, then the installation is performed.

At the step S112, when the operation to permit the privilege elevation has been made on the privilege elevation dialog 91, a shared folder creation process 42 (FIG. 3) creates a shared folder an access to which can be made from the web HMI server 10. The shared folder creation process 42 is performed by the pseudo thin client installer 15.

The shared folder is placed in a state where it can be accessed from the web HMI server 10 as a result of the client authentication information 29 having been input from the web HMI server 10. When the shared folder is set, then, at the above-described step S106, the server group information 28 and the client authentication information 29 are written to the memory 200b of the HMI client 20. As a result of this, the determination condition of the step S107 is satisfied and the processing to write the server group information 28 and the client authentication information 29 to the shared folder will be completed.

At the step S113, a resident process configuration process 43 (FIG. 3) copies a client resident program 17 (FIG. 4) from the web HMI server 10 to the shared folder. The resident process configuration process 43 is performed by the pseudo thin client installer 15. The pseudo thin client installer 15 starts installation of the client resident program 17.

At the step S114, the resident process configuration process 43 sets the client resident program 17 as the resident process 25 (FIG. 1). The client resident program 17 is set as the always background-run Windows® service. In the meantime, when the client resident program 17 is registered as the Windows® service, the account name and the password of the HMI client 20 are required. In view of this, the resident process configuration process 43 sets the client resident program 17 as the resident process 25 using the client authentication information 29 written to the shared folder.

According to this embodiment, the client authentication information that has been entered at the step S103 is used for two purposes, i.e., (1) for the web HMI server 10 to access the shared folder of the HMI client 20 and (2) for the HMI client 20 to set the client resident program 17 as the resident process 25 (FIG. 1). In other words, at the step S114, the user does not need to enter again the client authentication information, so that the operating costs can be reduced.

By the above-described process flow, the installation work to install the pseudo thin client is completed. In the above-described installation work, no server-specific settings are performed on the HMI client 20 except for the fact that the target server name is included in the URL. Also, the server-specific information is not included in the pseudo thin client installer 15. In the system of this embodiment, the server-specific information (server group information) is automatically distributed in response to or after the shared folder having been set in the HMI client 20. As a result, it is not necessary to prepare an installer that incorporates multiple pieces of server group information which differ from one another depending on the individual HMI clients 20.

In the meantime, the file which the pseudo thin client installer 15 copies from the web HMI server 10 to the HMI client 20 needs to be properly deployed in the web HMI server 10. In view of this, in order that the pseudo thin client installer 15 operates appropriately, a server installer 19 deploys necessary files in the memory 100b (e.g., a hard disk).

The server installer 19 deploys a server information distribution program 13, the installation HTML file 14, the pseudo thin client installer 15, the server group information table 16, the client resident program 17, and a server connection priority list table 18 in the memory 100b. The server information distribution program 13 is run, on the web server 11, as the server group information write process 30, a table sharing process 31, a connection priority list transmission process 32, and a table management process 44 depicted in FIG. 3. Also, the server information distribution program 13 includes the above-described HMI control program loaded onto the web browser 21.

<(2) Dynamic Distribution of Server Connection Priority List at the Time of Start of HMI Client>

Next, the client-server connection process after the installation and the dynamic distribution processing to dynamically distribute the server connection priority list will be described.

First, the server connection priority list will be described. At the time point at which the installation of a pseudo thin client is completed, the server connection priority of the servers is not determined. In other words, for each HMI client 20, it is not defined which web HMI server 10 is the primary server and which web HMI server 10 is the secondary server. The server connection priority is dynamically determined in response to the HMI client 20 acquiring the server connection priority list when it starts the HMI application.

The table sharing process 31 (FIG. 3) shares the server connection priority list table 18 among all the web HMI servers 10 pertaining to the server group. The server connection priority list table 18 (FIG. 4) defines the order of assignment for each of the multiple server connection priority lists such that the numbers of the HMI clients 20 connected to the individual web HMI servers 10 pertaining to the server group are equalized or substantially equalized. The server connection priority list defines the connection priorities of all the web HMI servers 10 pertaining to the server group. In the server connection priority list, the web HMI servers to which the HMI client 20 is connected are described in order of priority.

(A) of FIG. 10 is a server connection priority list table in the case where the number of servers is 2.

Figure 12:
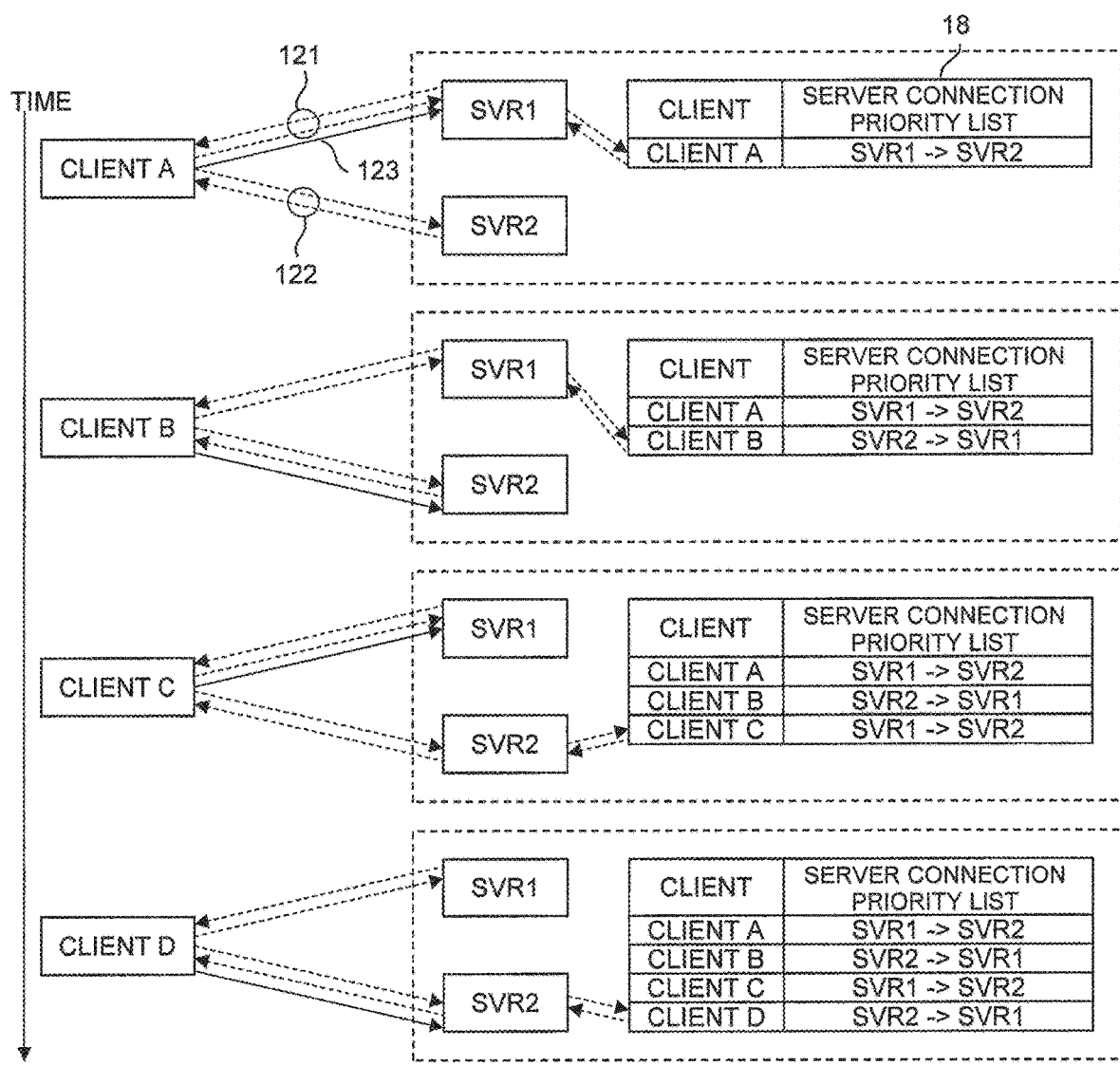
FIG. 12 is a diagram for explanation of an example of assignment of the server connection priority lists in the first embodiment of the present invention.

The server connection priority list table 18 is a table in which multiple pieces of information including the order of assignment, the server connection priority lists, the assignment destination clients, a connected flag, and the last connection time are stored, where these pieces of information are included in association with each other (FIG. 12). In FIG. 9, among these items, only the order of assignment and the server connection priority list are depicted.

The two web HMI servers 10 are the first web HMI server (SVR1) and the second web HMI server (SVR2). The server connection priority list table 18 includes at least a first server connection priority list assigned to an HMI client 20 to be connected first and a second server connection priority list assigned to another HMI client 20 to be connected second. The first server connection priority list and the second server connection priority list will be alternately assigned to the third and subsequent HMI clients 20 to be connected.

The first server connection priority list defines the connection priority such that the server SVR1 takes the first place, followed by the server SVR2. The second server connection priority list defines the connection priority for the server SVR2 and the server SVR1 in this order.

(B) of FIG. 10 is a server connection priority list table in the case where the number of servers is 3. The three web HMI servers 10 are the first web HMI server (SVR1), the second web HMI server (SVR2), and a third web HMI server (SVR3). The server connection priority list table 18 includes at least a first server connection priority list assigned to the HMI client 20 to be connected first, a second server connection priority list assigned to the HMI client 20 to be connected second, a third server connection priority list assigned to the HMI client 20 to be connected third, a fourth server connection priority list assigned to the HMI client 20 to be connected fourth, a fifth server connection priority list assigned to the HMI client 20 to be connected fifth, and a sixth server connection priority list assigned to the HMI client 20 to be connected sixth. The first to sixth server connection priority lists will be sequentially assigned to the seventh and subsequent HMI clients 20 to be connected.

The first server connection priority list defines the connection priorities in the order of SVR1, SVR2, and SVR3. The second server connection priority list defines the connection priorities in the order of SVR2, SVR3, and SVR1. The third server connection priority list defines the connection priorities in the order of SVR3, SVR1, and SVR2. The fourth server connection priority list defines the connection priorities in the order of SVR1, SVR3, and SVR2. The fifth server connection priority list defines the connection priori-ties in the order of SVR2, SVR1, and SVR3. The sixth server connection priority list defines the connection priorities in the order of SVR3, SVR2, and SVR1.

The following is the algorithm for generating the server connection priority list table.

The server in the case where the number of servers is given as n is to be indicated as "SVR(i)" (i=0, 1, . . . , n−1).

Here, "i" will be referred to as a server index of this server. The server index of the server SVR is indicated as "index (SVR)."

The following equation holds:

$$\text{index}(SVR(i))=i$$

The i-th server of the k-th server connection priority list in the case where the number of servers is "n" is indicated as "S(n, k, i)."

Here, $$n \geq 2$$

$$k=0,1,\ldots,n!-1$$

$$i=0,1,\ldots,n-1.$$

The reason why k≤n!−1 is that, if "k" is equal to or larger than "n!," then the server connection priority list in the case where "k" is equal to or smaller than "n!" should be repeatedly used.

This means that if m=(n!−1)×q+r (where q is an integer equal to or larger than 0, and r=0, 1, . . . , n!−1), then S(n, m, i)=S(n, r, i).

If n=2, then:

$$S(2,0,0)=SVR(0)$$

$$S(2,0,1)=SVR(1)$$

$$S(2,1,0)=SVR(1)$$

$$S(2,1,1)=SVR(0)$$

Consider P(n, k, i, b) to extend the number of servers to n+1. This indicates a server shifted by the server index of S(n, k, i) in the case where the number of servers is n+1 with the server SVR(b) serving as the origin. To be strict, this will be defined as follows:

$$P(n,k,i,b)=SVR((b+\text{index}(S(n,k,i)+1)\%(n+1))$$

Here, x % y represents the remainder of x modulo y. For example, 4%3=1.

Also, the ranges of the variables are as follows:

$$n \geq 2$$

$$k=0,1,\ldots,n!-1$$

$$i=0,1,\ldots,n-1$$

$$b=0,1,\ldots,n$$

For example, if n=2, then:

$$P(2,0,0,0)=SVR((0+0+1)\%3)=SVR(1)$$

$$P(2,0,1,0)=SVR((0+1+1)\%3)=SVR(2)$$

$$P(2,1,0,0)=SVR((0+1+1)\%3)=SVR(2)$$

$$P(2,1,1,0)=SVR((0+0+1)\%3)=SVR(1)$$

$$P(2,0,0,1)=SVR((1+0+1)\%3)=SVR(2)$$

$$P(2,0,1,1)=SVR((1+1+1)\%3)=SVR(0)$$

$P(2,1,0,1) = SVR((1+1+1)\%3) = SVR(0)$ $P(2,1,1,1) = SVR((1+0+1)\%3) = SVR(2)$ $P(2,0,0,2) = SVR((2+0+1)\%3) = SVR(0)$ $P(2,0,1,2) = SVR((2+1+1)\%3) = SVR(1)$ $P(2,1,0,2) = SVR((2+1+1)\%3) = SVR(1)$ $P(2,1,1,2) = SVR((2+0+1)\%3) = SVR(0)$

S(n+1, k, i) can be represented using P(n, k, i, b). Here, the range of k is as follows:

$k = 0, 1, \ldots, (n+1)! - 1$

Accordingly, it can be expressed as k=(n+1)×q+r. Here, the ranges of q and r are as follows:

$q = 0, 1, \ldots, n! - 1$ $r = 0, 1, \ldots, n$

If i=0, then S(n+1, k, i)=SVR(r)
If i=1, 2, ..., n, then S(n+1, k, i)=P(n, q, i−1, r)
According to the definition of P(n, k, i, b), S(n+1, k, i) can be represented by the following recurrence formula:
In the case where n≥2, assuming $k = (n+1) \times q + r$;

if $i = 0$, then $S(n+1, k, i) = SVR(r)$;

if $i = 1, 2, \ldots, n$, then $S(n+1, k, i) = SVR((r + \text{index}(S(n, q, i-1)) + 1)\%(n+1))$ If $n = 1$, then:

$S(n+1, 0, 0) = S(2, 0, 0) = SVR(0)$ $S(n+1, 0, 1) = S(2, 0, 1) = SVR(1)$ $S(n+1, 1, 0) = S(2, 1, 0) = SVR(1)$ $S(n+1, 1, 1) = S(2, 1, 1) = SVR(0)$

By this recurrence formula, all the server connection priority lists in the cases where the number of servers is 2 or more can be determined.

Since the server connection priority list table in the case where the number of servers is "n" can be generated based on the server connection priority list table in the case where the number of servers is n−1, the server connection priority list tables in the cases where the number of servers are 3, 4, 5, . . . can also be generated one after another based on the server connection priority list table in the case where the number of servers is 2.

The server connection priority list table in the case where the number of lists "k" is equal to or larger than n! is generated from the server connection priority list table in the case where k is n!. The server connection priority list table in the case where k is n! is defined as the basic priority list table.

When the basic priority list table is used for one round, then the basic priority list table is used again from the beginning and thereby the list can be generated even when the number of the clients increases unlimitedly.

If the number of servers is "n," then the number of the basic priority lists is n!. If n=2, then 2!=2. If n=3, then 3!=6, which agrees with the results of FIG. 10.

If the number of servers is "n," then "n" servers may appear in the first place in the list, and, with regard to the second to n-th servers, n×((n−1)!)=n! basic priority lists can be generated by ensuring correspondence of each of the basic priority lists in the case where the number of servers is n−1 using the above-described recurrence formula.

In the meantime, if multiple servers in the server group simultaneously access the server connection priority list table 18, it is possible that the same server connection priority list may be assigned to different HMI clients 20. In order to prevent this erroneous scenario, the update right to update the server connection priority list table 18 is owned by one single server in the server group. When the HMI client 20 requests the server connection priority list and this server has the update right to update the server connection priority list table, then a new server connection priority list is assigned immediately, and the server connection priority list is transmitted to the HMI client 20. Meanwhile, if it does not have the update right to update the server connection priority list table, then the server at issue requests the server having the server connection priority list table to provide the update right to update the server connection priority list table. In addition, after the update right to update the server connection priority list table has been acquired, the server connection priority list is assigned and transmitted to the HMI client 20.

Figure 11:
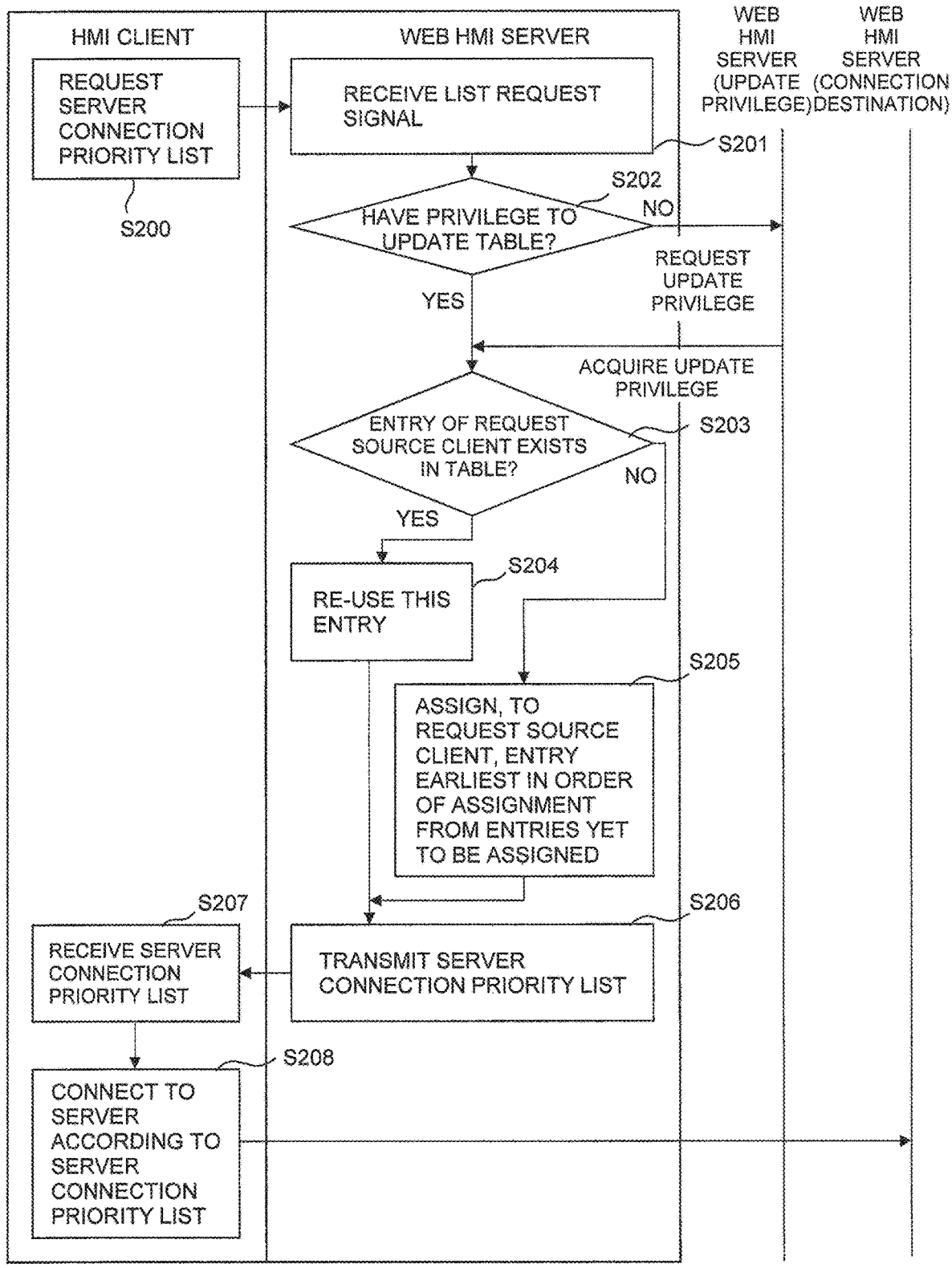
FIG. 11 is a flowchart for explanation of a distribution process flow to distribute a server connection priority list in the first embodiment of the present invention.

The procedure for acquisition of the server connection priority list will be described with reference to FIGS. 11 to 13 as well as FIG. 3. FIG. 3 is a block diagram for explanation of the processing executed in the HMI client 20 and the web HMI server 10. FIG. 11 is a flowchart for explanation of a distribution process flow to distribute the server connection priority list. FIG. 12 is a diagram for explanation of an example of assignment of the server connection priority list. FIG. 13 is a diagram that illustrates an example of the server group information table.

When the HMI client 20 is started, the HMI client 20 performs life-and-death confirmation for all the web HMI servers 10 described in the server group information 28 (FIG. 4) that has been acquired at the time of the installation. An alive monitoring process 33 (FIG. 3) monitors the operating states of all the web HMI servers 10 pertaining to the server group. This monitoring is performed using connectionless communications (e.g., REST protocol).

At the step S200 of FIG. 11, a connection priority list request process 34 (FIG. 3) transmits a list request signal for requesting the server connection priority list to any one of the web HMI servers 10 pertaining to the server group. The specific web HMI server 10 to which the list request signal should be transmitted is periodically changed. The list request signal is transmitted by connectionless communications (e.g., REST protocol).

At the step S201, the web HMI server 10 receives the list request signal from the request source client. The request source client is the HMI client 20 that has transmitted the list request signal.

At the step S202, the web HMI server 10 determines whether or not the server itself has the update right to update the server connection priority list table 18. As described above, the server connection priority list table 18 is shared by all the web HMI servers 10 pertaining to the server group (table sharing process 31).

If it has the update right, then the process proceeds to the step S203. If it does not have the update right, then it requests the web HMI server 10 having the update right to provide the update right and, after the update right has been acquired, the process proceeds to the step S203.

In the steps S203 to S206, the connection priority list transmission process 32 transmits the server connection priority lists in accordance with the order of assignment defined by the server connection priority list table 18. The server connection priority list defines the connection priorities of all the web HMI servers 10 pertaining to the server group.

First, at the step S203, the connection priority list transmission process 32 determines whether or not an entry corresponding to the request source client exists in the server connection priority list table 18. The connection priority list transmission process 32 determines that the entry exists therein if the request source client is registered in the "ASSIGNMENT DESTINATION CLIENT" field of the server connection priority list table 18. If the entry exists, then the process proceeds to the step S204. If the entry does not exist, then the process proceeds to the step S205.

At the step S204, the connection priority list transmission process 32 reuses the server connection priority list of the entry found in the step S203. FIG. 13 is an example of the server connection priority list table 18. In the example of FIG. 13, CLIENT E is already assigned to the second client. Hence, if the request source client is CLIENT E, then the server connection priority list of the second client is reused.

At the step S205, the connection priority list transmission process 32 assigns the entry having the earliest order of assignment among unassigned entries to the request source client.

At the step S206, the connection priority list transmission process 32 transmits the server connection priority list to the request source client. The transmission time is recorded in the "LAST CONNECTION TIME" field of the server connection priority list table 18.

At the step S207, the request source client receives the server connection priority list.

At the step S208, a server connection process 35 establishes connection with a web HMI server 10 having the highest connection priority defined in the server connection priority list from at least one or more operating web HMI servers 10 pertaining to the server group. Note that the operating state of the web HMI server 10 is continuously monitored by the alive monitoring process 33 which is a subroutine.

The web HMI server 10 to which the connection has been established by the process at the step S208 clears the "LAST CONNECTION TIME" field of the server connection priority list table 18.

FIG. 12 illustrates an example where the server connection priority list is acquired. FIG. 12 depicts an example where the clients A to D connect to the server group to which the server SVR1 and the server SVR2 pertain. The broken line 121 indicates the list request signal to the server SVR1 and the corresponding response signal. The broken line 122 indicates the list request signal to the server SVR2 and the corresponding response signal. The HMI client 20 switches the transmission destination servers of the list request signal every few seconds. As a result, the clients A and B transmit the list request signal to the server SVR1, whereas the clients C and D transmit the list request signal to the server SVR2.

First, when the list request signal is received from the client A, then the server SVR1 assigns the server connection priority list set to the first order of assignment to the client A. The client A establishes connection enabling two-way communications (solid line 123) with the server SVR1 having the highest priority. As the protocol, for example, WebSocket is used.

Next, when the list request signal is received from the client B, the server SVR1 assigns the server connection priority list set to the second order of assignment to the client B. The client B establishes connection enabling two-way communications with the server SVR2 having the highest priority.

Next, when the list request signal is received from the client C, the server SVR2 assigns the server connection priority list set to the third order of assignment to the client C. The client C establishes connection enabling two-way communications with the server SVR1 having the highest priority.

Next, when the list request signal is received from the client D, then the server SVR2 assigns the server connection priority list set to the fourth order of assignment to the client D. The client D establishes connection enabling two-way communications with the server SVR2 having the highest priority.

As has been described in the foregoing, according to the processing at the time of start of the client illustrated in FIG. 11, the HMI client 20 can dynamically acquire the server connection priority list from the web HMI server 10. By virtue of this, preliminary settings associated with the server connection priority do not need to be made on the HMI client 20.

Also, since the server connection priority lists are distributed to the HMI clients 20 in accordance with the order of assignment which takes into account the load balancing, preliminary settings for redundancy and load balancing do not need to be made on the HMI clients 20. Also, as the preliminary settings are not necessary, connection to this system is allowed even when the mobile terminal is used for an evaluation terminal or temporary monitoring.

Also, since the server connection priority list is dynamically distributed when the HMI client 20 connects to the server group, an HMI client 20 of which operation is stopped is precluded from the scope of load balancing and the total load of the operating clients as the system as a whole is equalized and distributed among the servers.

It should be noted that the web HMI server 10 performs the table management process 44 that manages the entries of the server connection priority list table 18. The table management process 44 updates the "CONNECTED FLAG" field and the "LAST CONNECTION TIME" field of the server connection priority list table 18 (FIG. 12) according to the client-server connection statuses. When the HMI client 20 has connected to the web HMI server 10, the table management process 44 sets the connected flag to "Connected." When the connection between the HMI client 20 and the web HMI server 10 ceases to exist, the table management process 44 sets the connected flag to "Disconnected" and records the "LAST CONNECTION TIME." Also, the table management process 44 periodically checks the last connection times of the entries of the server connection priority list table 18 and confirms whether or not a predetermined period of time has elapsed. When the predetermined period of time has elapsed for an entry, then the entry is deleted. Specifically, data of the "ASSIGNMENT DESTINATION CLIENT" field, the "CONNECTED FLAG" field, and the "LAST CONNECTION TIME" field of this entry are cleared.

<Fail-Over Process>

When the currently connected web HMI server 10 fails, the HMI client 20 performs a fail-over process 36 and connects to another web HMI server 10 to continue operation. When the currently connected web HMI server 10 is placed in a non-operating state, the fail-over process 36 switches the connection to the connection to the web HMI server 10 having the highest connection priority defined in the server connection priority list from at least one or more operating web HMI servers 10 pertaining to the server group. The HMI client 20 always recognizes the operating states of the individual web HMI servers 10 by the alive monitoring process 33. By virtue of this, the fail-over process 36 can make a fail-over to the operating server instantaneously, and the impact on the operation due to the server failure can be suppressed to a minimum level.

<Fail-Back Process>

When the web HMI server 10 is restored, the HMI client 20 performs a fail-back process 37. The fail-back process 37 switches connections from the current connection to the connection to a web HMI server 10 having a high connection priority if the web HMI server 10 having a higher connection priority than the web HMI server 10 to which the HMI client 20 is currently connected is operating. The HMI client 20 always recognizes the operating states of the individual web HMI servers 10 by the alive monitoring process 33. By virtue of this, it can recognize the fact that the faulty server has been restored. If the restored server has a higher connection priority than the currently connected server, fail-back to the restored server can be instantaneously made. By virtue of this, even when the server is restored, the optimum load balancing can be maintained.

Figure 14:
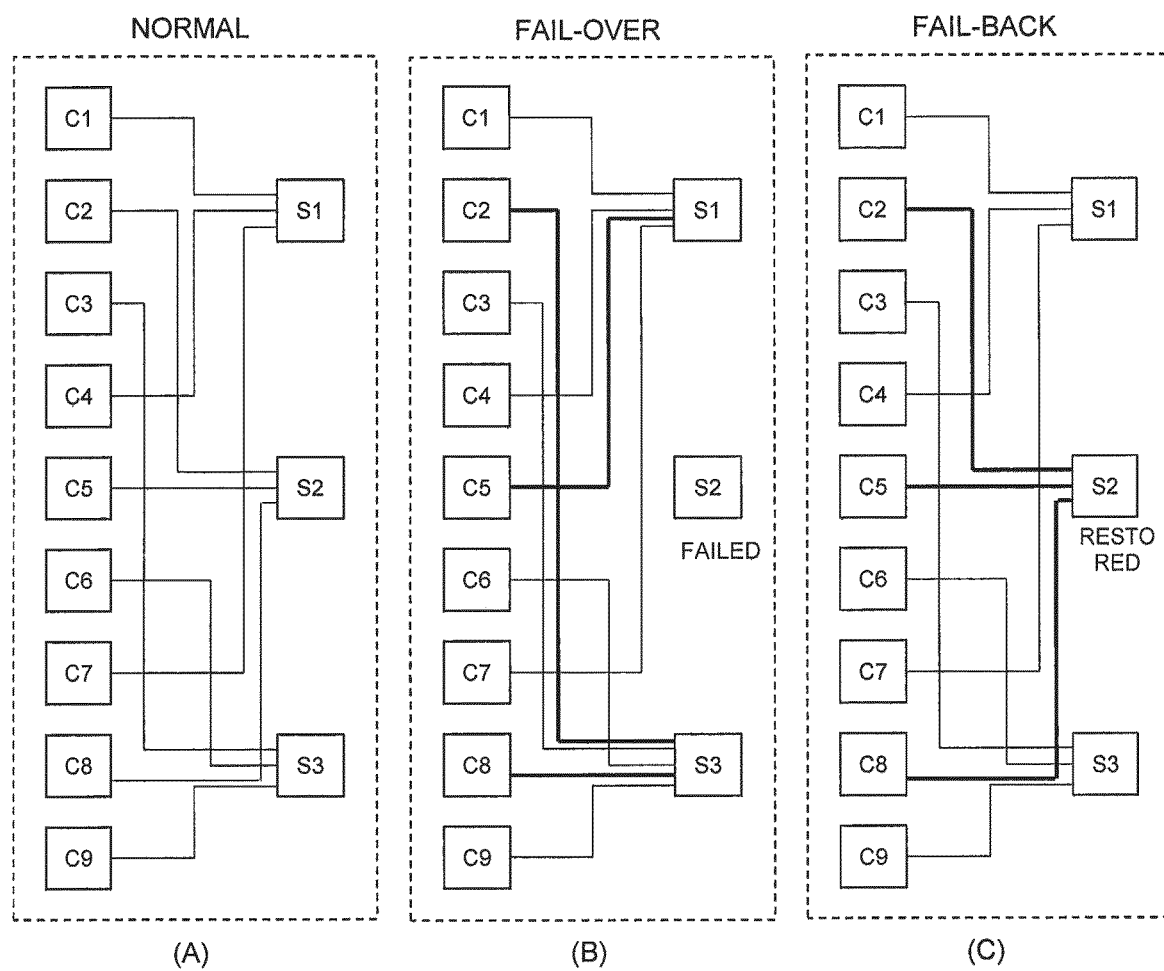
FIG. 14 is a diagram that illustrates an example of a fail-over process and a fail-back process in the first embodiment of the present invention.

FIG. 14 is a diagram that illustrates an example of fail-over process and fail-back process. (A) of FIG. 14 illustrates a state where all the web HMI servers (S1, S2, S3) pertaining to the server group are operating, and the HMI clients (C1 to C9) are connected to the primary server. (B) of FIG. 14 illustrates a state where S2 failed and the fail-over process 36 has been executed. C2 is re-connected to S1 which is the secondary server, whereas C5 and C8 are re-connected to S3 which is the secondary server. (C) of FIG. 14 illustrates a state where S2 is restored and the fail-back process 37 is executed. C2, C5, and C8 are re-connected to S2 which is the primary server.

Also, when the fail-over process 36 or the fail-back process 37 is executed, the HMI client 20 performs a PLC information collection process 41. The PLC information collection process 41 requests the web HMI server 10 after the switching of the connections to collect, from the PLC 2, the status information of the parts arranged in the HMI screen which was displayed on the web browser 21 prior to the switching of the connections. By virtue of this, the web browser 21 can re-acquire the signal data of the PLC 2 included in the HMI screen which was opened immediately before the fail-over or the fail-back. Also, the message, a transmission error of which occurred during the fail-over, can be re-acquired. The operator is allowed to continue to perform the work prior to the fail-over or the fail-back even after the switching.

As has been described in the foregoing, according to the SCADA web HMI system in accordance with this embodiment, it is made possible to reduce the operating cost necessary in client settings while ensuring redundancy and load balancing of servers.

<Hardware Configuration Example>

FIG. 15 is a block diagram that illustrates an example of a hardware architecture provided in the web HMI server 10 and the HMI client 20.

The processes of the above-described web HMI server 10 can be implemented by a processing circuit. The processing circuit is configured by, and through interconnection of, a processor 100*a*, a memory 100*b*, a network interface 100*c*, an input interface 100*d*, and at least one display 100*e*. The processor 100*a* realizes the functions of the web HMI server 10 by running various programs stored in the memory 100*b*. The memory 100*b* includes a ROM unit, a RAM unit, an HDD, an SSD, etc. The network interface 100*c* is a device that connects to the PLC 2 and the HMI client 20 via the computer network and can transmit and receive PLC signals and control commands. The input interface 100*d* is an input device such as a keyboard, mouse, touch panel, etc.

The processes of the above-described HMI client 20 are implemented by a processing circuit. The processing circuit is configured by, and through interconnection of, a processor 200*a*, a memory 200*b*, a network interface 200*c*, an input interface 200*d*, and at least one display 200*e*. The processor 200*a* realizes the functions of the HMI client 20 by running the various programs stored in the memory 200*b*. The memory 200*b* includes a ROM unit, a RAM unit, an HDD, an SSD, etc. The network interface 200*c* is a device that connects to the web HMI server 10 and can transmit and receive PLC signals and control commands. The input interface 200*d* is an input device such as a keyboard, mouse, touch panel, etc. Note that the HMI client 20 may be a mobile terminal such as a tablet PC.

Whilst the embodiments of the present invention have been described in the foregoing, the present invention is not limited to the above-described embodiments and may be implemented with various modifications made thereto within the range where the scope of the present invention is not deviated from.

REFERENCE SIGNS LIST

10 web HMI server
11 web server
13 server information distribution program
14 installation HTML file
15 pseudo thin client installer
16 server group information table
17 client resident program
18 server connection priority list table
19 server installer
20 HMI client
21 web browser
22 HMI control process
23 client control process
24 web server
25 resident process
26 client resource
28 server group information
30 server group information write process
31 table sharing process
32 connection priority list transmission process
33 alive monitoring process
34 connection priority list request process
35 server connection process
36 fail-over process
37 fail-back process
38 server group information request process
39 installer execution confirmation process
40 privilege elevation process
41 PLC information collection process
42 shared folder creation process
43 resident process configuration process
44 table management process
71 address bar
81 notification bar
91 privilege elevation dialog
100*a* processor
100*b* memory
100*c* network interface
100*d* input interface 100e display
200a processor
200b memory
200c network interface
200d input interface
200e display

The invention claimed is:

1. A SCADA web HMI system comprising:
a plurality of HMI clients that run a web browser displaying a human machine interface (HMI) screen, wherein parts indicative of a state of a plant are arranged on the HMI screen; and
a plurality of web HMI servers that connect to a programmable logic controller and transmit a display signal for updating of states of the parts to the web browser in accordance with a PLC signal received from the programmable logic controller, wherein at least two of the web HMI servers pertain to the same server group,
each of the web HMI servers including
at least one processor and
a memory that stores a program, wherein the program, when being run by the at least one processor, causes the at least one processor to perform processing including:
a table sharing process of sharing a server connection priority list table by all of the web HMI servers pertaining to the server group; and
in response to a list request signal being received from the HMI client, a connection priority list transmission process of transmitting a server connection priority list, the server connection priority list defining connection priorities of all of the web HMI servers pertaining to the server group, wherein the server connection priority list is transmitted in accordance with order of assignment defined in the server connection priority list table,
the server connection priority list table defining the order of assignment such that, for each of a plurality of the server connection priority lists, numbers of the HMI clients connecting to each of the web HMI servers pertaining to the server group are made close to an equal number,
each of the HMI clients including:
at least one processor; and
a memory that stores a program, wherein the program, when being run by the at least one processor, causes the at least one processor to perform processing including:
an alive monitoring process of monitoring operating states of all of the web HMI servers pertaining to the server group;
a connection priority list request process of transmitting, to any one of the web HMI servers pertaining to the server group, the list request signal for requesting the server connection priority list;
in response to the server connection priority list being received, a server connection process of establishing connection to the web HMI server having a highest connection priority defined in the server connection priority list from at least one or more of the operating web HMI servers pertaining to the server group; and
in response to the currently connected web HMI server entering a non-operating state, a fail-over process of switching connection from connection to the currently connected web HMI server to connection to the web HMI server having a highest connection priority defined in the server connection priority list from at least one or more of the operating web HMI servers pertaining to the server group.

2. The SCADA web HMI system according to claim 1, wherein
the web HMI servers includes a first web HMI server and a second web HMI server that pertain to the server group,
the server connection priority list table includes:
a first server connection priority list assigned to the HMI client which connects to the web HMI servers first; and
a second server connection priority list assigned to the HMI client which connects to the web HMI servers second,
the first server connection priority list defines connection priorities in the order of the first web HMI server and the second web HMI server, and
the second server connection priority list defines connection priorities in the order of the second web HMI server and the first web HMI server.

3. The SCADA web HMI system according to claim 1, wherein
the web HMI servers include a first web HMI server, a second web HMI server, and a third web HMI server that pertain to the server group,
the server connection priority list table includes:
a first server connection priority list assigned to the HMI client connected to the web HMI servers first;
a second server connection priority list assigned to the HMI client connected to the web HMI servers second;
a third server connection priority list assigned to the HMI client connected to the web HMI servers third;
a fourth server connection priority list assigned to the HMI client connected to the web HMI servers fourth;
a fifth server connection priority list assigned to the HMI client connected to the web HMI servers fifth; and
a sixth server connection priority list assigned to the HMI client connected to the web HMI servers sixth,
the first server connection priority list defines connection priorities in the order of the first web HMI server, the second web HMI server, and the third web HMI server,
the second server connection priority list defines connection priorities in the order of the second web HMI server, the third web HMI server, and the first web HMI server,
the third server connection priority list defines connection priorities in the order of the third web HMI server, the first web HMI server, and the second web HMI server,
the fourth server connection priority list defines connection priorities in the order of the first web HMI server, the third web HMI server, and the second web HMI server,
the fifth server connection priority list defines connection priorities in the order of the second web HMI server, the first web HMI server, and the third web HMI server, and
the sixth server connection priority list defines connection priorities in the order of the third web HMI server, the second web HMI server, and the first web HMI server.

4. The SCADA web HMI system according to claim 1, wherein the program of the HMI client causes the at least one processor to perform processing including:
a server group information request process of transmitting a server group information request signal to a target web HMI server which is a web HMI server designated by an URL including a target server name, the server group information request signal being used to request server group information which defines the server group;

a client authentication information transmission process of transmitting client authentication information including an account name and a password of the HMI client;

an installer execution confirmation process of downloading a pseudo thin client installer from the target web HMI server to the web browser and displaying a notification bar for running the pseudo thin client installer;

in response to an operation that allows execution of the pseudo thin client installer being made on the notification bar, a privilege elevation process of displaying a privilege elevation dialog for granting an administrator privilege of the HMI client;

in response to an operation that allows privilege elevation being made on the privilege elevation dialog, a shared folder creation process of creating a shared folder to which access is allowed to be made from the web HMI server as a result of the client authentication information being input from the web HMI server; and a resident process configuration process of copying a client resident program from the web HMI server to the shared folder and setting the client resident program as a resident process using the client authentication information written to the shared folder, the program of the web HMI server causes the at least one processor to perform processing including:

in response to the server group information request signal being received, a server group information write process of repeating writing of the server group information until the server group information which defines server names of all servers of the server group to which the target web HMI server pertains is written to the shared folder; and in response to the client authentication information being received, a client authentication information write process of repeating writing of the client authentication information until the client authentication information is written to the shared folder.

5. The SCADA web HMI system according to claim 1, wherein the program of the HMI client causes the at least one processor to perform processing including:

in response to the web HMI server being operating with a higher connection priority than that of the currently connected web HMI server, a fail-back process of switching connections from connection to the currently connected web HMI server to connection to the web HMI server having the higher connection priority.

6. The SCADA web HMI system according to claim 5, wherein the program of the HMI client causes the at least one processor to perform processing including:

in response to the fail-over process or the fail-back process being performed, a PLC information collection process of requesting the web HMI server after the switching of the connection to collect, from the programmable logic controller, status information of the parts arranged on the HMI screen displayed on the web browser prior to the connection being switched.

\* \* \* \* \*